US009215089B2

(12) United States Patent
Muroyama et al.

(10) Patent No.: US 9,215,089 B2
(45) Date of Patent: Dec. 15, 2015

(54) TOUCH SENSOR SYSTEM

(75) Inventors: Masanori Muroyama, Sendai (JP); Masayoshi Esashi, Sendai (JP); Shuji Tanaka, Sendai (JP); Sakae Matsuzaki, Sendai (JP); Mitsutoshi Makihata, Sendai (JP); Yutaka Nonomura, Nagoya (JP); Motohiro Fujiyoshi, Seto (JP); Takahiro Nakayama, Nagoya (JP); Ui Yamaguchi, Toyota (JP); Hitoshi Yamada, Aichi-gun (JP)

(73) Assignees: TOHOKU UNIVERSITY, Sendai-Shi (JP); KABUSHIKI KAISHA TOYOTA CHUO KENKYUSHO, Aichi-Gun (JP); TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 734 days.

(21) Appl. No.: 13/502,078

(22) PCT Filed: Oct. 14, 2009

(86) PCT No.: PCT/JP2009/005358
§ 371 (c)(1),
(2), (4) Date: Jun. 20, 2012

(87) PCT Pub. No.: WO2011/045835
PCT Pub. Date: Apr. 21, 2011

(65) Prior Publication Data
US 2012/0254490 A1    Oct. 4, 2012

(51) Int. Cl.
*G06F 13/00* (2006.01)
*H04L 12/40* (2006.01)
(Continued)

(52) U.S. Cl.
CPC .......... *H04L 12/40032* (2013.01); *G01L 1/142* (2013.01); *G01L 1/146* (2013.01); *G01L 5/228* (2013.01); *G06F 13/376* (2013.01); *H04L 12/40013* (2013.01)

(58) Field of Classification Search
CPC .............. H04L 12/40; H04L 12/40013; H04L 12/40019; G01L 5/228
USPC ................................. 710/107, 100, 305–306
See application file for complete search history.

(56) References Cited

U.S. PATENT DOCUMENTS

2007/0271399 A1 * 11/2007 Peng et al. .................... 710/1
2011/0083517 A1    4/2011 Muroyama et al.

FOREIGN PATENT DOCUMENTS

JP    59-148448 A    8/1984
JP    64-032550 A    2/1989
(Continued)

OTHER PUBLICATIONS
JP 2008-126328 A (Toyota Motor Corp) Jun. 5, 2008.*
(Continued)

*Primary Examiner* — Tim T Vo
*Assistant Examiner* — Kim T. Huynh
(74) *Attorney, Agent, or Firm* — Kenyon & Kenyon LLP

(57) ABSTRACT

A touch sensor system includes buses, a plurality of touch sensor devices disposed on the buses, and an information integrating device that is connected to all the buses and integrates information from the touch sensor device. The touch sensor device includes a sensor unit and a signal processing unit that transmits a sensor data signal generated by processing an analog sensor signal to the information integrating device through the bus. The signal processing unit includes a digital converting unit, a threshold evaluating unit that gives a start permission of the signal process when a sensor value exceeds a preset threshold, an ID adding unit that adds a transmitter identification number to the sensor signal, and a data transmitting unit that outputs the sensor data signal to a signal line of the bus. Fast responses are made possible without increasing the amount of data and host processing load while including many touch sensor elements.

18 Claims, 10 Drawing Sheets

(51) Int. Cl.
*G01L 1/14* (2006.01)
*G01L 5/22* (2006.01)
*G06F 13/376* (2006.01)

(56) References Cited

FOREIGN PATENT DOCUMENTS

| | | |
|---|---|---|
| JP | 02-230838 A | 9/1990 |
| JP | 06-178354 A | 6/1994 |
| JP | 06-261047 A | 9/1994 |
| JP | 2003-127080 A | 5/2003 |
| JP | 2006-281347 A | 10/2006 |
| JP | 2006-287520 A | 10/2006 |
| JP | 2006-337315 A | 12/2006 |
| JP | 2007-010482 A | 1/2007 |
| JP | 2007-078382 A | 3/2007 |
| JP | 2007-285784 A | 11/2007 |
| JP | 2008-26178 A | 2/2008 |
| JP | 2008-126328 A | 6/2008 |
| WO | 2011/045837 A1 | 4/2011 |
| WO | 2011/045929 A1 | 4/2011 |

OTHER PUBLICATIONS

International Search Report mailed Jan. 19, 2010 of PCT/JP2009/005358.

* cited by examiner

TOUCH SENSOR SYSTEM

This is a 371 national phase application of PCT/JP2009/005358 filed 14 Oct. 2009, the contents of which are incorporated herein by reference.

TECHNICAL FIELD

The present invention relates to a touch sensor system that is provided to a surface part (such as a hand part or an entire body surface) of a robot, for example, and detects a contact with an object.

BACKGROUND ART

Development of humanoid robots is under progress. Advanced operations are required for the humanoid robot, such as coming into contact with people, autonomously avoiding obstacles, and grasping and moving an object. Since a touch sense is necessary for such operations, the research for providing the touch sensors to the robot hand and the entire body surface has been proceeding in recent years (for example as in PTLs 1 to 6).

Conventional touch sensor systems mainly adopt the mesh structure. For example, electrode lines are formed to each of the two electrode sheets. Then, the meshed wiring is formed by disposing the electrode sheets opposite to each other so that each of the electrode lines perpendicularly intersects. A pressure-sensitive conductive member is sandwiched between the two electrode sheets or a touch sensor element is disposed on each intersection of the electrode lines. Each touch sensor element converts a change in pressure or temperature caused by the contact with the object into an electric signal change according to the amount of the change.

The control unit is connected to each electrode line and centrally manages the plurality of touch sensor elements. More specifically, the control unit selects each touch sensor element in order and samples a sensor value of each sensor. In the control unit, the electric signals from the touch sensor elements are accumulated and data processed. Periodical repeating of such sampling operation detects whether the robot is in contact with the object and further which sensor is in contact. Then, it is possible to sense what position and what extent of strength the robot is in contact with the object.

CITATION LIST

Patent Literature

PTL 1: Japanese Unexamined Patent Application Publication No. 2006-337315
PTL 2: Japanese Unexamined Patent Application Publication No. 2007-10482
PTL 3: Japanese Unexamined Patent Application Publication No. 2007-285784
PTL 4: Japanese Unexamined Patent Application Publication No. 2007-78382
PTL 5: Japanese Unexamined Patent Application Publication No. 2006-287520
PTL 6: Japanese Unexamined Patent Application Publication No. 2006-281347

SUMMARY OF INVENTION

Technical Problem

The conventional touch sensor systems have the following problems.

As the control unit functions as a host, centrally manages a number of touch sensor elements, selects each touch sensor element in order, and samples the sensor value of each sensor, a sampling interval becomes longer along with the increase in the number of sensors.

This inevitably reduces the response speed and results in slow responses.

Further, as the control unit samples all the touch sensor elements in order, sensor data is obtained also from the touch sensor to which no force is applied. Then, the amount of data to be processed by the control unit is enormous, thereby increasing the processing load of the control unit and also the processing time.

Moreover, a considerable amount of power is needed to process the enormous amount of data.

Additionally, there are following problems also in each of PTLs 1 to 6.

Although PTLs 1 and 2 provide enough sensitivity to the mesh wiring system, there is even more problems in the increase in the amount of data and the increase in the host load.

PTL 3 selects a touch sensor that focuses on the touch sensor element with detected pressure to be sensed from a plurality of sheet-like touch sensors.

This reduces the amount of data and computational complexity to some extent.

However, the host control unit centrally manages a number of sensors, and evaluation of pressurization and exchange of data requests must be processed by the host control unit, and thus there still is a problem in the reduction in the amount of data the reduction in the host load.

PTL 4 discloses that the flexible substrate is used in wiring and a foldable region and a severable region are provided, then adjusting arrangement density of the touch sensor elements and adjusting a mounting region can be easily performed.

However, when the number of sensor elements increases, the problem of the increase in the amount of data and the host load remains.

PTLs 5 and 6 disclose that in a configuration of an interconnected touch sensor system, the bottleneck in the transfer can be avoided and further the load in the information processing by the host side can be reduced. Specifically, when an output value of the touch sensor can be predicted from an output value of an adjacent sensor, the sensor data is not transmitted to the host.

However, as it is the interconnected type, the path of the sensor information must be sequentially built.

Further, as it is necessary to continue outputting the data depending on the sensor value of the touch sensor, the reduction in the amount of data and host processing load may not be realized.

A purpose of the present invention is to provide a touch sensor system that is capable of fast responses without increasing the amount of data and the host processing load while including a number of touch sensor elements.

Solution to Problem

A touch sensor system according to the present invention includes
one or more buses,
a plurality of touch sensor devices that are disposed on each of the bus, and an information integrating device that is connected to all the buses and integrates information from the plurality of touch sensor devices, in which the touch sensor device includes a sensor unit that outputs an analog sensor signal, in which the analog sensor signal changes according to an action from a detecting object, and a signal processing unit that transmits a sensor data signal to the information integrating device through the bus, in which the sensor data signal is the processed analog sensor signal from the sensor unit, in which the signal processing unit includes a digital converting unit that digitally converts the analog sensor signal, a threshold evaluating unit that gives a start permission of a signal process when a sensor value by the sensor unit exceeds a preset threshold, an ID adding unit that adds a transmitter identification number to the sensor data signal, in which the transmitter identification number is previously added to itself, and a data transmitting unit that outputs the sensor data signal to a signal line of the bus.

In such a configuration, the touch sensor device includes the sensor unit and the signal processing unit, and the analog sensor signal is processed in the signal processing unit. As described above, as the signal processing is executed in individual touch sensor devices, the signal processing load of the information integrating device can be reduced.

Such a configuration can reduce the increase in the processing load of the information integrating device even when there are many touch sensor devices disposed in the sensor system, thus a novel touch sensor system can be achieved that is capable of fast responses even though it is a large system with many touch sensor devices.

The touch sensor device includes the digital converting unit that digitally converts the analog sensor signal.

Accordingly, as the touch sensor device transmits the digital signal to the information integrating device, even when the wiring length between the touch sensor device and the information processing device is long, it is not susceptible to the influence of noise.

When the touch sensor devices are provided to the entire body surface, the entire wiring length will be considerable, thus the noise immunity becomes important.

The configuration of the present invention is suitable for a sensor system including a number of touch sensor devices as compared to the case of transmitting analog signals as is.

The touch sensor device includes the threshold evaluating unit that transmits sensor data to the information integrating device only when the sensor value exceeds a predetermined threshold.

Accordingly, the amount of data flowing through the bus is reduced as a whole and bus crosstalk is reduced.

Since there is no bus crosstalk, the transmission waiting time is reduced and the sensed data is transmitted at desired timings from each touch sensor device to the information integrated device, thereby resulting in faster responses.

Moreover, transmission and reception of the data is not performed when there is no detection or the detection of threshold or less, the amount of data processed by the information integrating device is reduced and the processing load of the information integrating device is reduced.

The sensor system is achieved with less bus crosstalk and fast responses even when the number of touch sensor devices increases.

The touch sensor device includes an ID adding unit that adds its own transmitter identification number and transmits the sensor data signal.

The information integrating device can identify the source touch sensor device by this transmitter identification number.

Thus, the exchange of request packets between the information integrating device and the touch sensor device will be unnecessary, and the touch sensor device can transmit the sensor data immediately when there is the detection exceeding the threshold.

When the exchange of the request packets occurs among a number of touch sensor devices, the buses may be crossed.

In this regard, the present invention can build the sensor system that reduces the amount of data flowing through the bus and capable of fast responses even when a number of touch sensor devices are provided.

Further, since the touch sensor device can be arranged anywhere on the bus, the arrangement of the touch sensor devices can be freely changed.

For example, while closely placing many touch sensor devices on the hand part, the number of touch sensor devices can be less on the back part.

Furthermore, as the plurality of touch sensor devices can be disposed on one bus, the number of lines can be dramatically reduced as compared to the case of wiring each touch sensor device.

DESCRIPTION OF EMBODIMENTS

Figure 1:
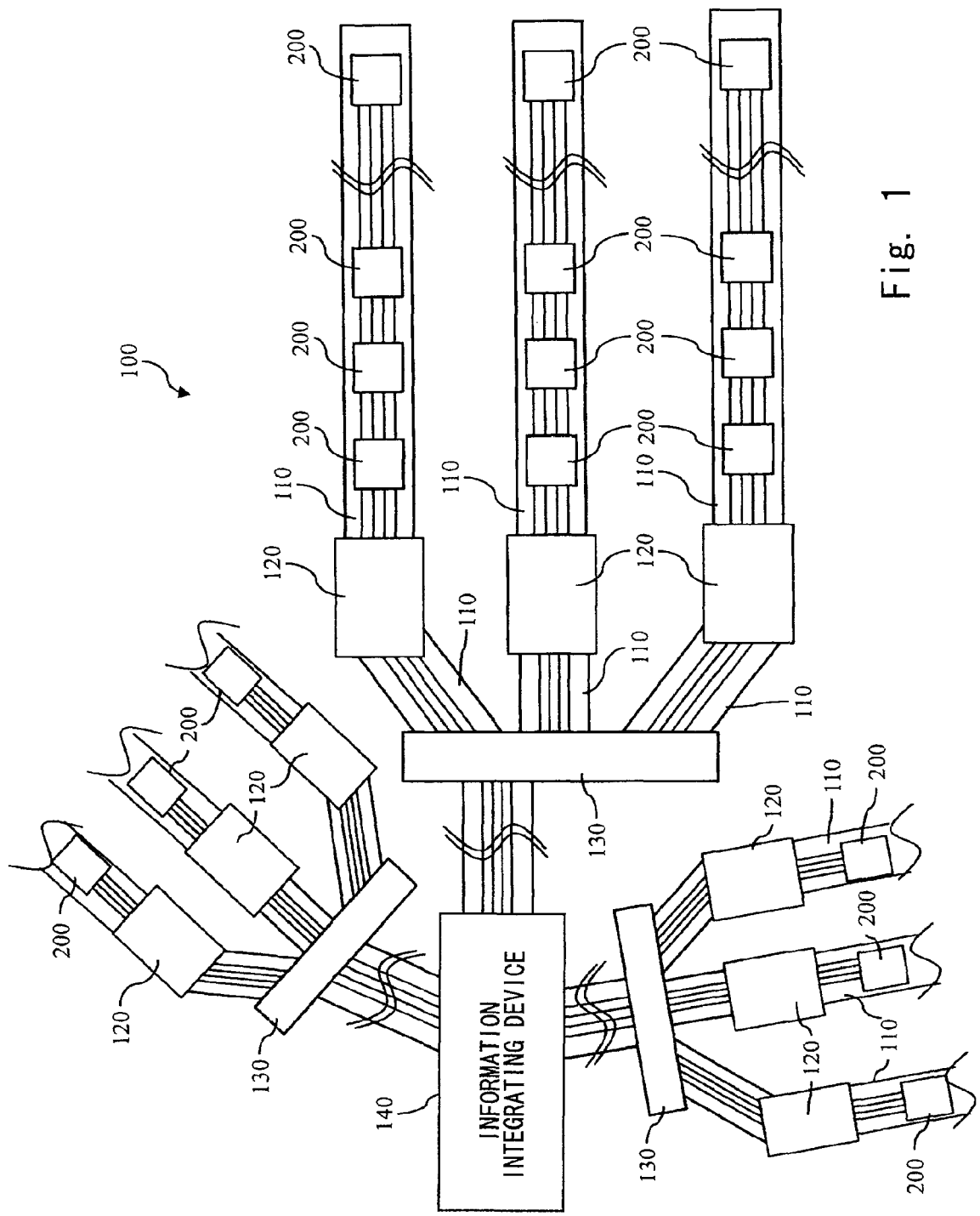
FIG. 1 is an overall block diagram of a touch sensor system.

An embodiment of the present invention is explained with reference to the codes given to each component in the drawings.

First Embodiment

A first embodiment according to a touch sensor system 100 of the present invention is explained.

FIG. 1 is an overall block diagram of the touch sensor system 100.

Figure 2:
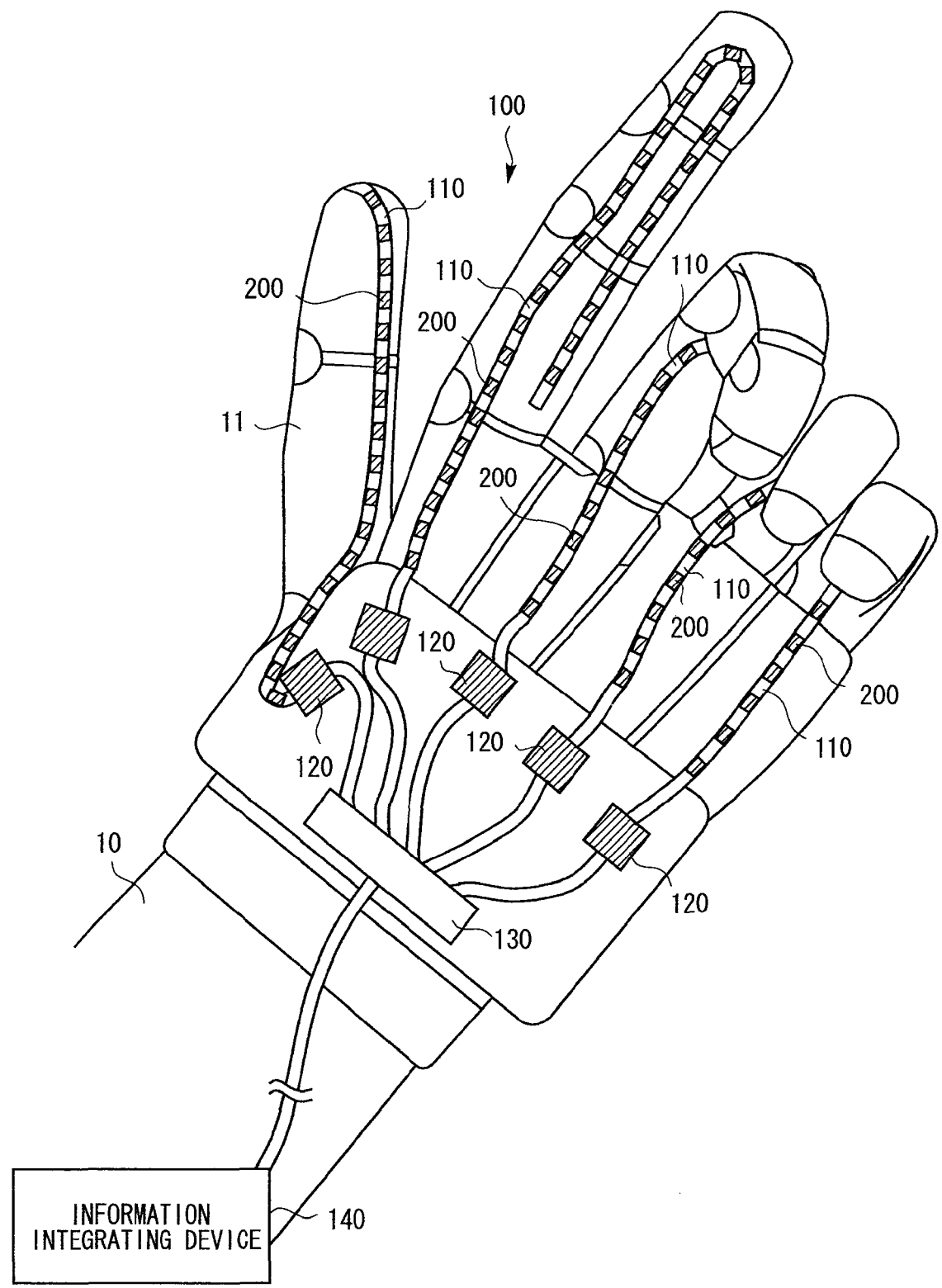
FIG. 2 shows a state of applying the touch sensor to a robot hand.

FIG. 2 is a view showing a state in which the touch sensor system 100 is applied to a robot hand.

Figure 3:
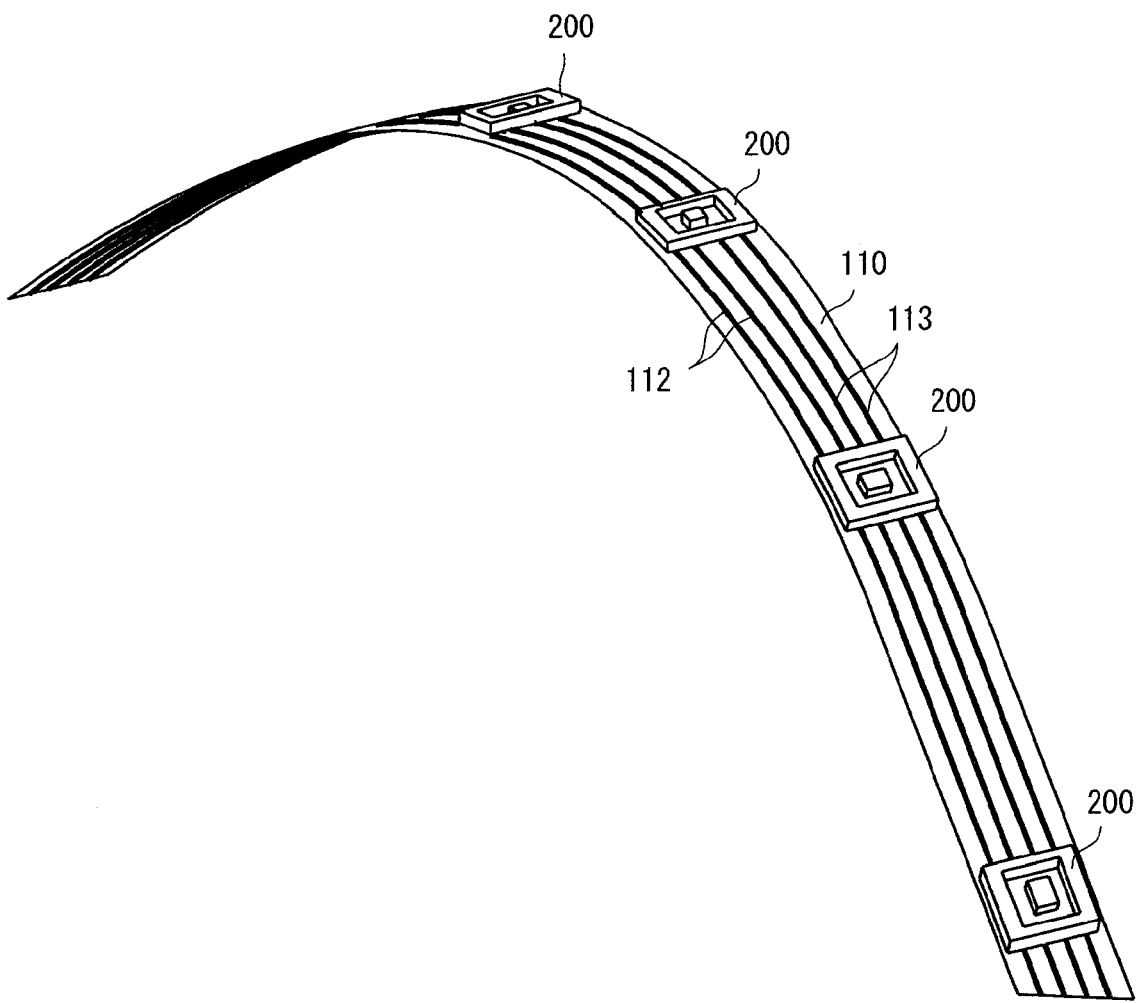
FIG. 3 shows a state in which a plurality of touch sensor devices are disposed on a bus.

FIG. 3 is a view showing a state in which a plurality of touch sensor devices 200 are disposed on buses 110.

The touch sensor system 100 includes the plurality of buses 110, the plurality of touch sensor devices 200, an information relaying device 120, a concentrator 130, and an information integrating device 140.

The buses 110 are wired to a flexible substrate 111 as shown in FIG. 3.

As wiring lines of the bus 110, four lines 112, 112, 113, and 113 are provided.

Two of the four are power supply lines 112 and 112, and two are signal lines 113 and 113 for differential serial transmission.

The plurality of touch sensor devices 200 are provided to each bus 110.

The information relaying device 120 is provided on the way of each bus 110, and further the plurality of buses 110 are once connected to the concentrator 130.

Then, all the buses 110 are connected to the information integrating device 140 via the information relaying device 120 and the concentrator 130.

At this time, phase delay in the communication speed is preferably within $\pi$ (radian) in each point on the bus.

Then, the operation of a bus state evaluating unit is stably performed and collision between signals from a plurality of sensor units is avoided.

The wiring structure of the bus 110 is not limited to the example shown in FIG. 1, but can be freely changed, and can be various wiring structures such as a streak of string-shaped, tree-shaped, branch-shaped, fishbone-shaped, net-shaped, ring-shaped, star-shaped, surface-shaped, and lattice-shaped.

Figure 4:
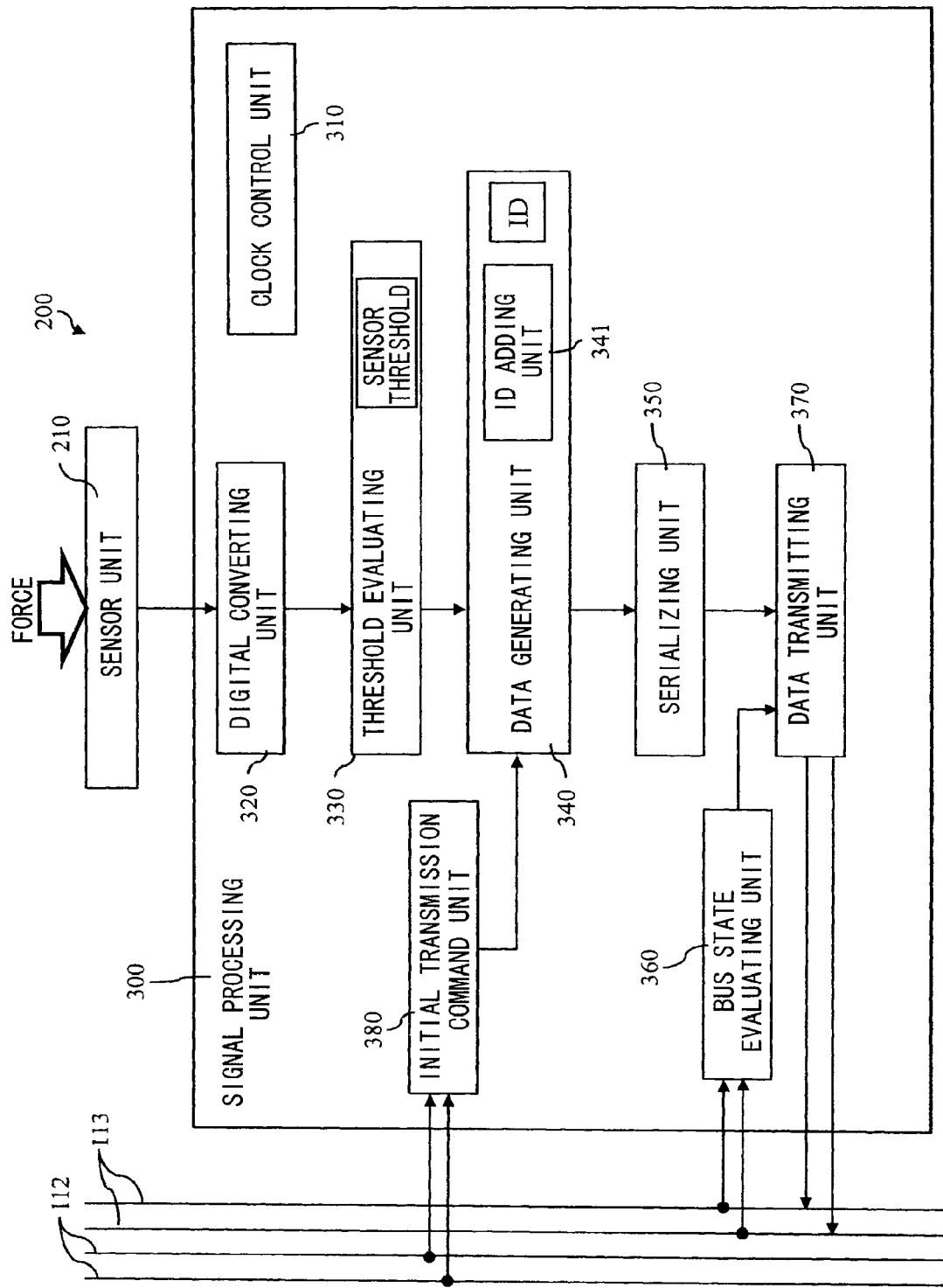
FIG. 4 is a functional block diagram of the touch sensor device.

FIG. 4 is a functional block diagram of the touch sensor device.

Figure 5:
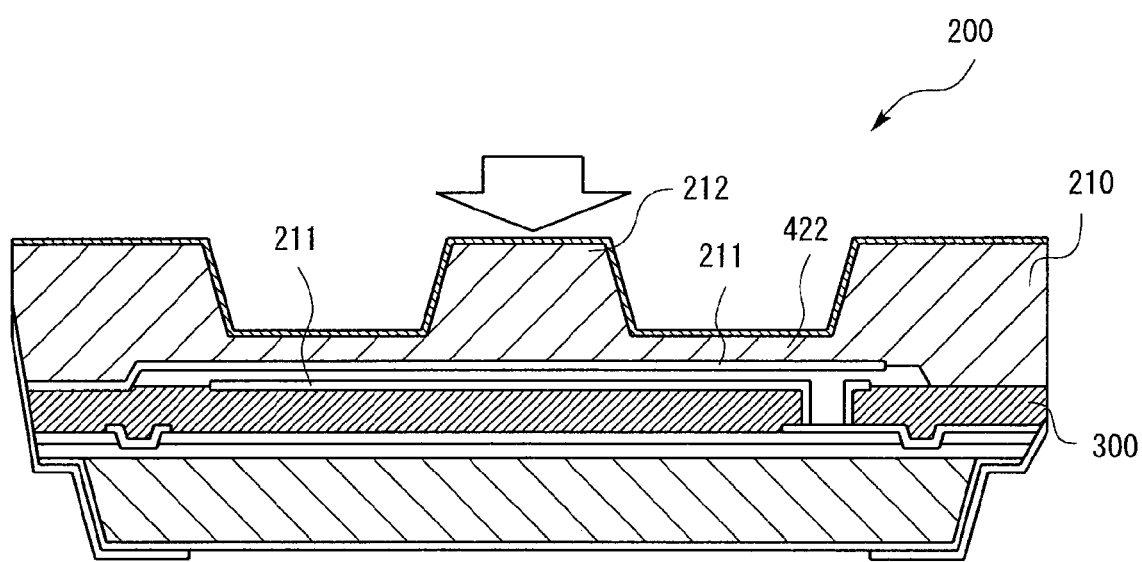
FIG. 5 is a cross-sectional diagram showing an example of a structure of the touch sensor device.

FIG. 5 is a cross-sectional diagram showing an example of the structure of the touch sensor device 200.

The touch sensor device 200 includes a sensor unit 210 and a signal processing unit 300.

Here, the sensor unit 210 and the signal processing unit 300 are bonded and the touch sensor device 200 is integrated in one chip.

In this example, a diaphragm force sensor unit 210 and an LSI integrating the signal processing unit 300 are bonded by an adhesive layer 220, and the whole is an integrated one package.

The sensor unit 210 includes two electrode plates 211 and 211 that are disposed opposite to each other.

Further, the upper surface of the sensor unit 210 is a sensor surface 212 that is in contact with an object, and when the sensor surface 212 is pressed, a gap between the two electrode plates 211 and 211 changes. A capacity change caused by the change in an electrode plate gap is an analog sensor signal.

Figure 6:
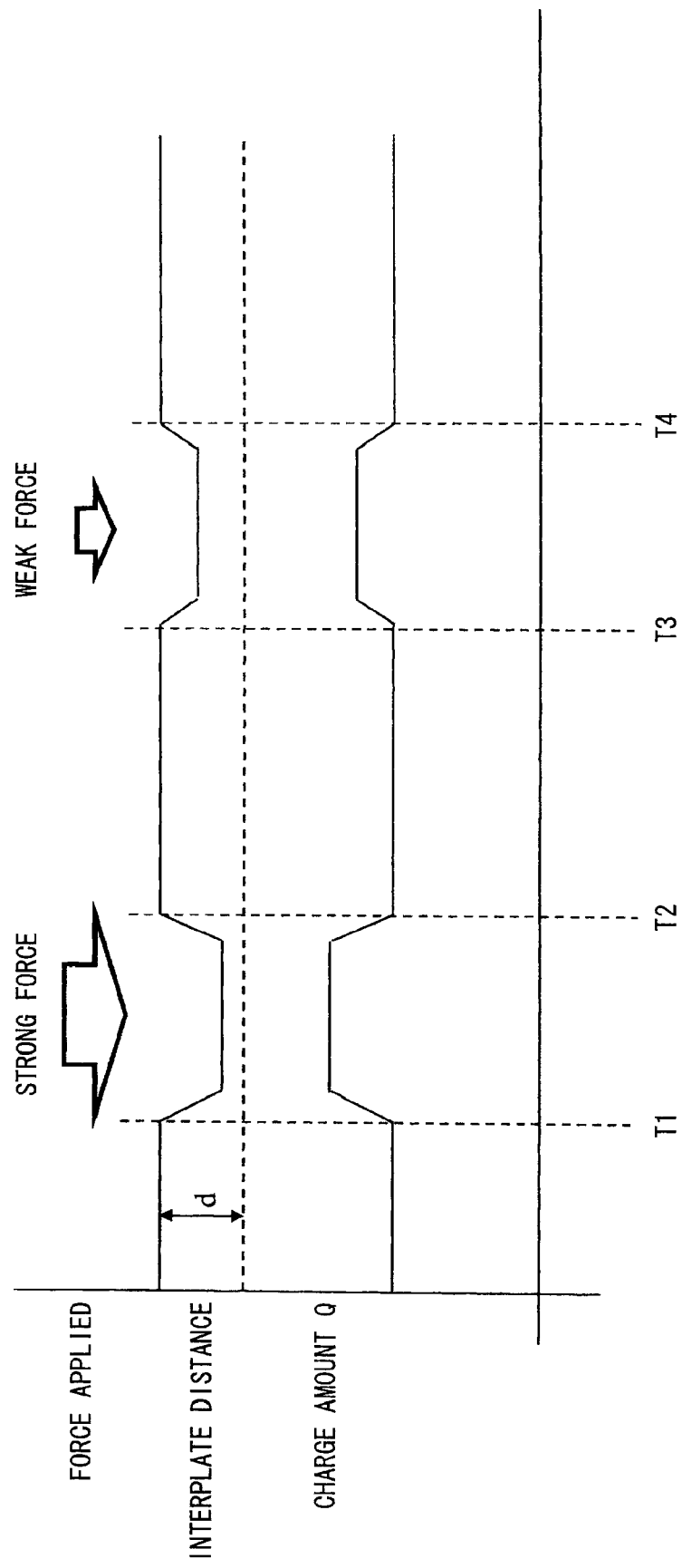
FIG. 6 shows a state of change in an interplate distance d and an interplate charge amount Q according to an applied force.

For example, as shown in FIG. 6, suppose that a strong force is applied to the sensor surface 212 from the time T1 to the time T2, and a weak force is applied to the sensor surface 212 from the time T3 to T4.

Then, an interplate distance d changes according to the applied force.

A charge amount accumulated between the plates changes according to the change in the interplate distance d.

An interplate charge amount Q that changes according to the applied force is retrieved as the analog sensor signal.

The analog sensor signal is output to the signal processing unit 300 and processed.

The block diagram of the signal processing unit 300 is shown in FIG. 4.

The signal processing unit 300 includes a clock control unit 310, a digital converting unit 320, a threshold evaluating unit 330, a data generating unit 340, a serializing unit 350, and a bus state evaluating unit 360, a data transmitting unit 370, and an initial transmission command unit 380.

The clock control unit 310 generates clocks and divides the frequency of the clocks by a predetermined frequency, and supplies the operational clocks to each functional unit 310 to 380.

The digital converting unit 320 digitally converts the analog signal from the sensor unit 210.

Figure 7:
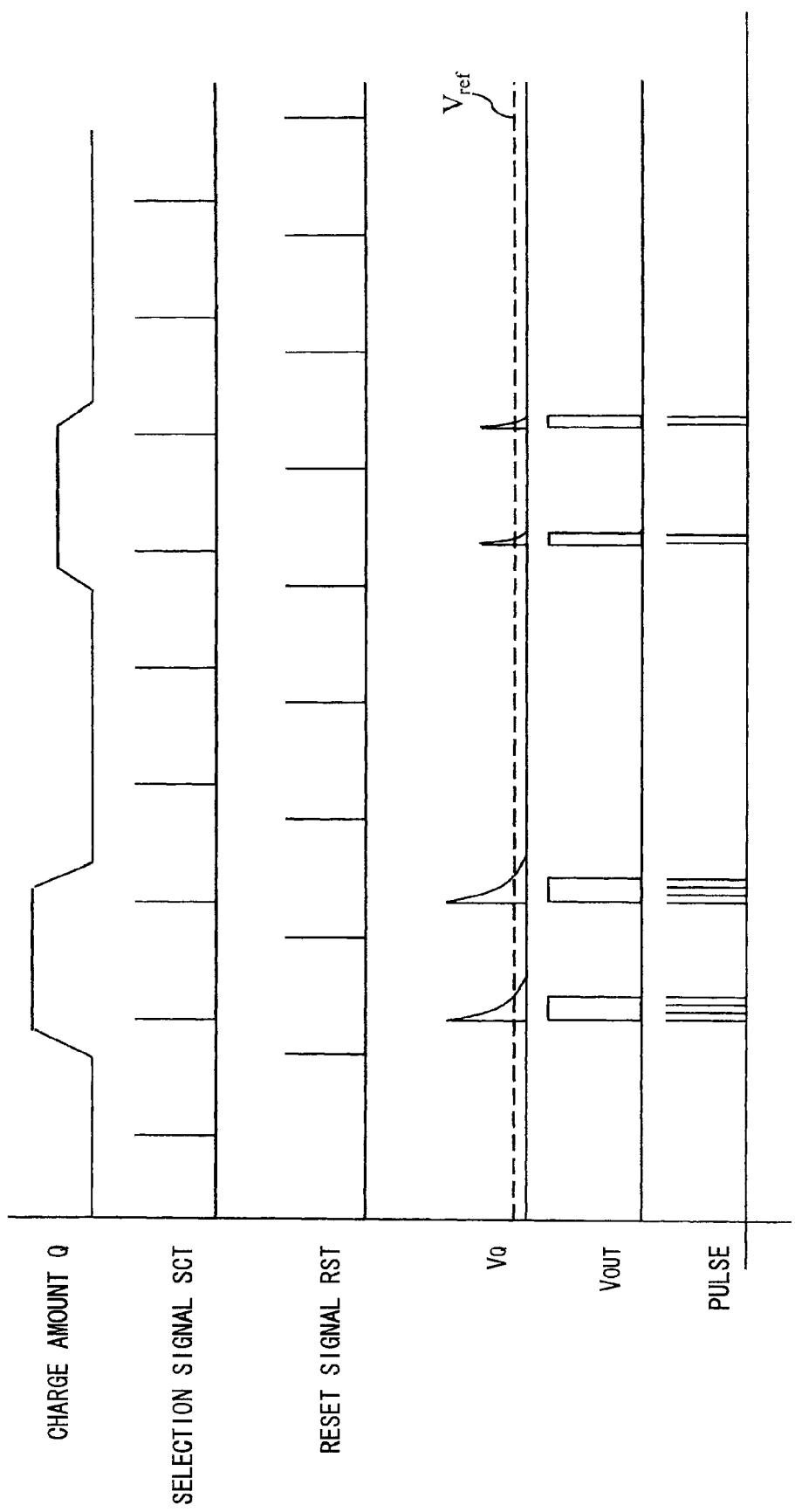
FIG. 7 is a view for explaining a procedure of digitally converting a capacity change into a frequency change.

The state of digitally converting the capacity change into the frequency change is explained using FIG. 7.

At the time of retrieving the sensor signal from the sensor unit 210, the digital converting unit 320 outputs a selection signal Sct and a reset signal Rst at a constant cycle.

The selection signal Sct is an ON signal of a switch (not shown) disposed between the electrode plate 211 and the signal processing unit 300.

The reset signal Rst is a signal for setting the charge of the electrode plate to GND once and resetting it.

The interplate charge amount Q is retrieved at a constant cycle by the selection signal Sct.

The interplate charge amount Q retrieved in this way is converted into a voltage VQ through a predetermined resistor.

This VQ is contrasted with a predetermined reference voltage Vref.

Then, VQ generates a pulse signal Vout with a time width when VQ exceeds Vref. At this time, when a charge extraction speed is constant, the height of VQ and a pulse width of Vout have a positive correlation.

Vout is converted into a pulse signal with a predetermined frequency by a pulse generator (not shown).

Counting the number of pulses per unit time enables measurement of the force applied to the sensor unit 210 as a digital amount.

The sensor signal digitalized by the frequency conversion in this way shall be a digital sensor signal.

A predetermined sensor threshold is set to the threshold evaluating unit 330.

The threshold evaluating unit 330 contrasts the digital sensor signal with the sensor threshold.

When the digital sensor signal does not exceed the sensor threshold, the process of the sensor signal is stopped.

On the other hand, when the digital sensor signal exceeds the sensor threshold, the process for externally outputting the sensor signal is continued by the data generating unit 340.

When the threshold evaluating unit 330 evaluates that the digital sensor signal exceeds the sensor threshold, the data generating unit 340 generates the transmission data to be transmitted to the information integrating device 140.

Here, different transmitter identification number IDs are set to each touch sensor device 200.

The transmitter identification number IDs are set not to overlap with each other and be different between the touch sensor devices that are arranged to the same bus 110.

Further, an end number indicating an end is given to the touch sensor device 200, which is disposed at the end of the bus 110, as the transmitter identification number ID.

As an example, a maximum value that can be set as a transmitter identification signal is the end number.

For example, when the transmitter identification number ID is set in the range of 0 to 255, the end number is 255.

The data generating unit 340 includes the ID adding unit 341 that adds the transmitter identification number ID to the digital sensor signal.

When the digital sensor signal exceeding the sensor threshold is given from the threshold evaluating unit 330, the ID adding unit 341 adds its own transmitter identification number ID to this digital sensor signal.

Figure 8:
FIG. 8 is a view showing a configuration example of transmission data.

Additionally, the data generating unit 340 adds a preamble, a start bit, a CRC bit (Cyclic Redundancy Check), and a stop bit, and generates the transmission data (see FIG. 8).

Moreover, the data generating unit 340 encodes the transmission data according to the transmission system (for example, 4B5B encoding).

The serializing unit 350 serializes the transmission data generated by the data generating unit 340 for serial transmission.

The bus state evaluating unit 360 evaluates the state of the signal line 113 of the bus 110 at a constant cycle.

To be more specific, the bus state evaluating unit 360 evaluates whether the signal line 113 is busy or free. Then, the evaluation result is output to the data transmitting unit 370. That is, when the bus 110 is busy, a transmission standby instruction is output.

Moreover, when the bus 110 is free, a transmission permission is output.

Note that when the bus 110 is busy, the bus state evaluating unit 360 evaluates the state of the bus 110 again after preset waiting time has elapsed.

Further, when the bus 110 is continuously evaluated to be busy, the waiting time is increased at a predetermined ratio.

The data transmitting unit 370 transmits the transmission data generated by the data generation unit 340 on the signal line 113 of the bus 110.

At this time, the data transmitting unit 370 confirms the instructions from the bus state evaluating unit 360 before the data transmission.

Specifically, when there is the transmission standby instruction, the data transmitting unit 370 does not transmit the data and stands by.

Moreover, when there is the transmission permission from the bus state evaluating unit 360, the transmission data is transmitted on the signal line 113 of the bus 110.

Note that the data transmitting unit 370 includes a counter (not shown) that counts the time standing by and waiting for the transmission of data.

Then, when holding time of the transmission data to be transmitted exceeds predetermined time (maximum holding time) in a state with no transmission permission, the sensor data signal is discarded.

Further, the counter starts counting the time after the data is transmitted once, and stops the data transmission for the transmission interval time to space a preset transmission interval until the next transmission.

The data transmitting unit 370 transmits the data by the differential serial transmission system when transmitting the data.

Note that the data transmitting unit 370 transmits the data by asynchronous communication using the clocks generated by the clock control unit 310 as a reference.

Accordingly, without exchanging request packets with the information integrating device 140, the data transmitting unit 370 starts the data transmission at its own timing after the transmission permission is obtained.

The clocks of each signal processing unit are used as the clocks used in communication, and the clocks of the information integrating device are not used.

With such a configuration, a bus line dedicated for clocks is unnecessary.

As the clocks used in the communication are generated for each sensor unit, a preamble for the asynchronous communication is provided to the beginning of the data.

Moreover, in order to facilitate the asynchronous communication, generation of information for synchronization is performed by a 4b5b encoding unit, and also NRZI (Non Return to Zero, Inverted) is used.

The information integrating device synchronizes the signals with the transmitting side by CDR (Clock Data Recovery).

In this system, in order to reduce the number of buses, reduce the size of the signal processing unit by simplified communication, avoid congestion by the reduction of traffic, and improve the communication speed, bus control by the information integrating device or the touch sensor device is not performed.

Accordingly, the handshake represented by ACK and NAK is not performed.

Therefore, a cyclic redundancy code (code for error detection) represented by CRC is used to improve data reliability.

The data received by the information integrating device is analyzed, and when an error is detected by CRC, the data is discarded.

In general communications, NAK is transmitted when a communication error is detected and a request for retransmitting the data is made, however this embodiment adopts the communication mode of one direction from the sensor unit to the information integrating device, thus the request for data retransmission is not made and only data discarding is performed.

Accordingly, the stability of the control system can be efficiently maintained.

The initial transmission command unit 380 commands the data generating unit 340 to transmit the transmitter identification number ID when the power is turned on.

While different transmitter identification number IDs are set to each touch sensor device 200, after the initial transmission command unit 380 detects the power-on and stands by for the standby time according to the transmitter identification number ID, commands the data generating unit 340 to transmit the transmitter identification number ID.

Here, the time taken to execute the transmission of the transmitter identification number ID by one touch sensor device 200 as an initial transmission shall be Ts, and the transmitter identification number ID shall be set between 0 to 255. In this case, an example is shown in which the standby time according to the transmitter identification number ID is set to (ID value)×Ts.

Setting the standby time of each touch sensor device results in a shift between transmission timings, thus the buses 110 are not congested, and thereby enabling smooth initial setting.

The information relaying device 120 is provided on the way of the bus 110, relays the data of the touch sensor device 200 which is provided to this bus 110, and transmits it to the information integrating device 140.

Different transmitter identification number IDs are set to each information relaying device 120 that further adds its own transmitter identification number ID to the data from the touch sensor device 200.

The concentrator 130 is connected to the plurality of buses 130 and concentrates these plurality of buses 110.

Different transmitter identification number IDs are set to the concentrators 130 that further add its own transmitter identification number IDs to the data from the touch sensor device 200.

Although the transmitter identification numbers of the plurality of touch sensor devices provided to one bus must be different from each other, the same transmitter identification number may be given to the different touch sensor devices 200 when the buses 110 are different.

Accordingly, as the transmitter person identification number IDs of the information relaying device 120 and the concentrator 130 are added while the data is transmitted via the information relaying device 120 and the concentrator 130, even when the same transmitter identification number ID is added, the information integrating device 140 recognizes the touch sensor devices 200 as different ones.

The information integrating device 140 receives the transmission data from each touch sensor device 200 and integrates all the information.

The information integration by the information integrating device 140 detects what extent of force is applied to where on the touch sensor system 100.

Further, the information integrating device 140 performs initial setting after the power is turned on.

In the initial setting, after the power is turned on, each transmitter identification number ID transmitted from each touch sensor device 200 is received, and a communication network of the sensor system is built.

More specifically, the transmitter identification number IDs of all the touch sensor devices 200 connected to the system are grasped, and how the touch sensor devices 200 are connected to the bus 110 via the concentrator 130 and the information relaying device 120 is further grasped.

Note that when coordinates of each touch sensor device 200 must be registered to the information integrating device 140 as in the case of providing the touch sensor system 100 on the robot surface, the position of each touch sensor device may be learned based on the sensor data signal when the object with previously identified position concerned each touch sensor device.

Alternatively, the network structure may be built using the position information of each sensor device 200 that is set and input externally.

An operation of each touch sensor device 200 in the touch sensor system 100 including such a configuration is explained with reference to the flowchart.

Figure 9:
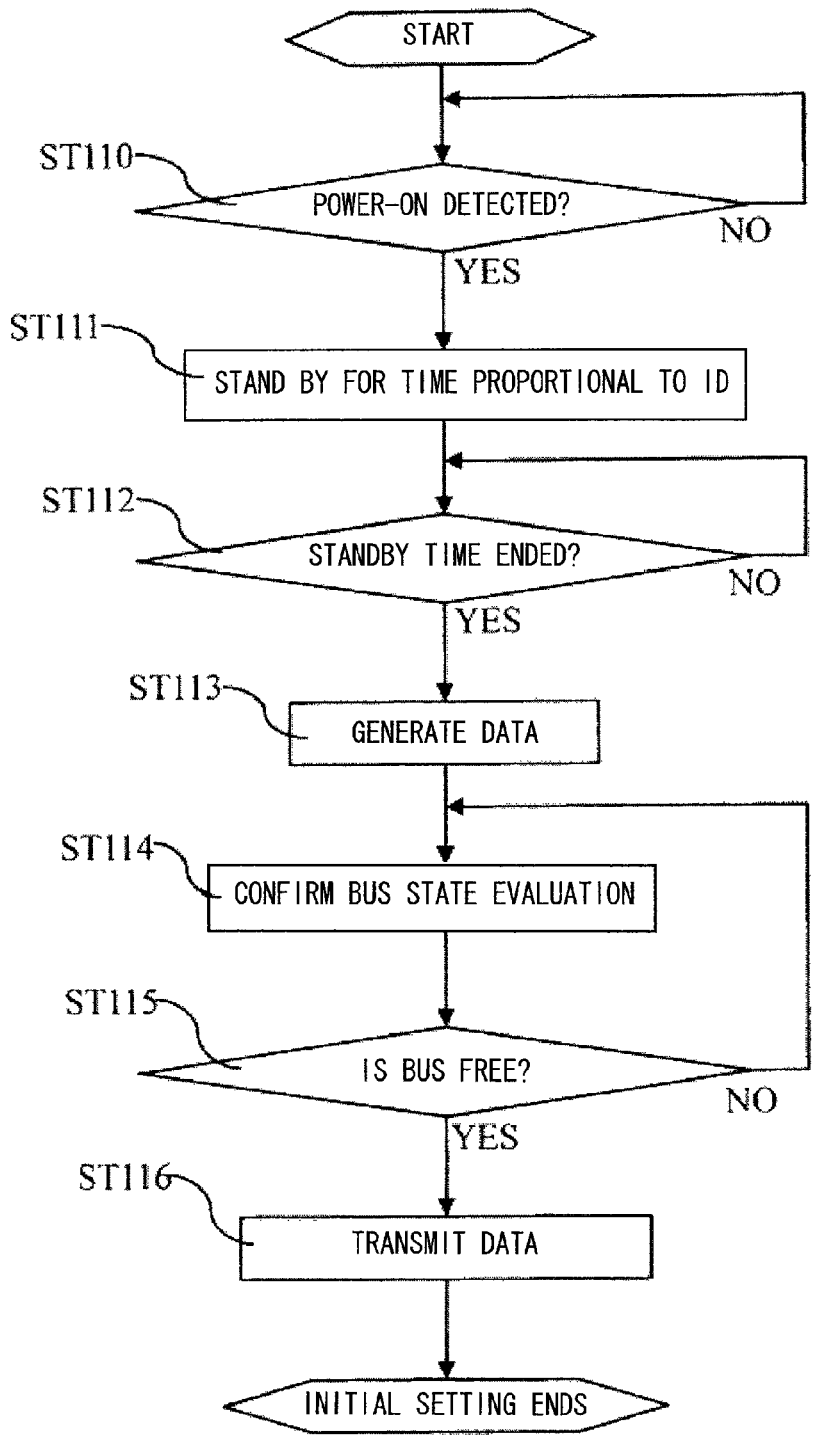
FIG. 9 is a flowchart showing an operation procedure of initial setting in the touch sensor device.

FIG. 9 is a flowchart showing an operation procedure of the initial setting in each touch sensor device 200.

When the power is turned on, the initial transmission command unit 380 detects this.

When the initial transmission command unit 380 detects the power-on (ST110: YES), the initial transmission command unit 380 stands by for the time according to the transmitter identification number ID given to its own touch sensor device 200 (ST111).

When the standby time ends (ST112:YES), generation of the transmission data is instructed to the data generation unit 340.

The data generating unit 340 adds a preamble, a start bit, a CRC bit (Cyclic Redundancy Check), and a stop bit to the transmitter identification number ID given to itself, and generates the transmission data (ST113).

The generated transmission data is transmitted to the data transmitting unit 370.

The data transmitting unit 370 confirms the evaluation result by the bus state evaluating unit 360 before the data transmission (S114).

At the time of initial transmission, as each touch sensor device 200 stands by for the standby time according to the transmitter identification number ID that is respectively given to itself, the congestion of the buses 110 is considered to be small.

When the state of the bus 110 is free (ST115:YES), the data transmitting unit 370 transmits the transmission data on the signal line 113 of the bus 110 (ST116).

Note that when the bus 110 is busy (ST115:NO), predetermined time is waited for and the state of the bus 110 is evaluated again (ST114).

The initial transmission from all the touch sensor devices 200 is received by the information integrating device 140.

Thus, the information integrating device 140 grasps the transmitter identification number IDs of all the touch sensor devices 200 that are connected to the system, and further grasps how the touch sensor devices 200 are connected to the bus 110 via the concentrator 130 and the information relaying device 120.

The initial setting is completed as described above.

Note that when the communication system goes down due to the congestion of the buses 110 exceeding a limit value, the information integrating device 140 resets the system by turning the power on again and executes the operation of the initial setting again.

Figure 10:
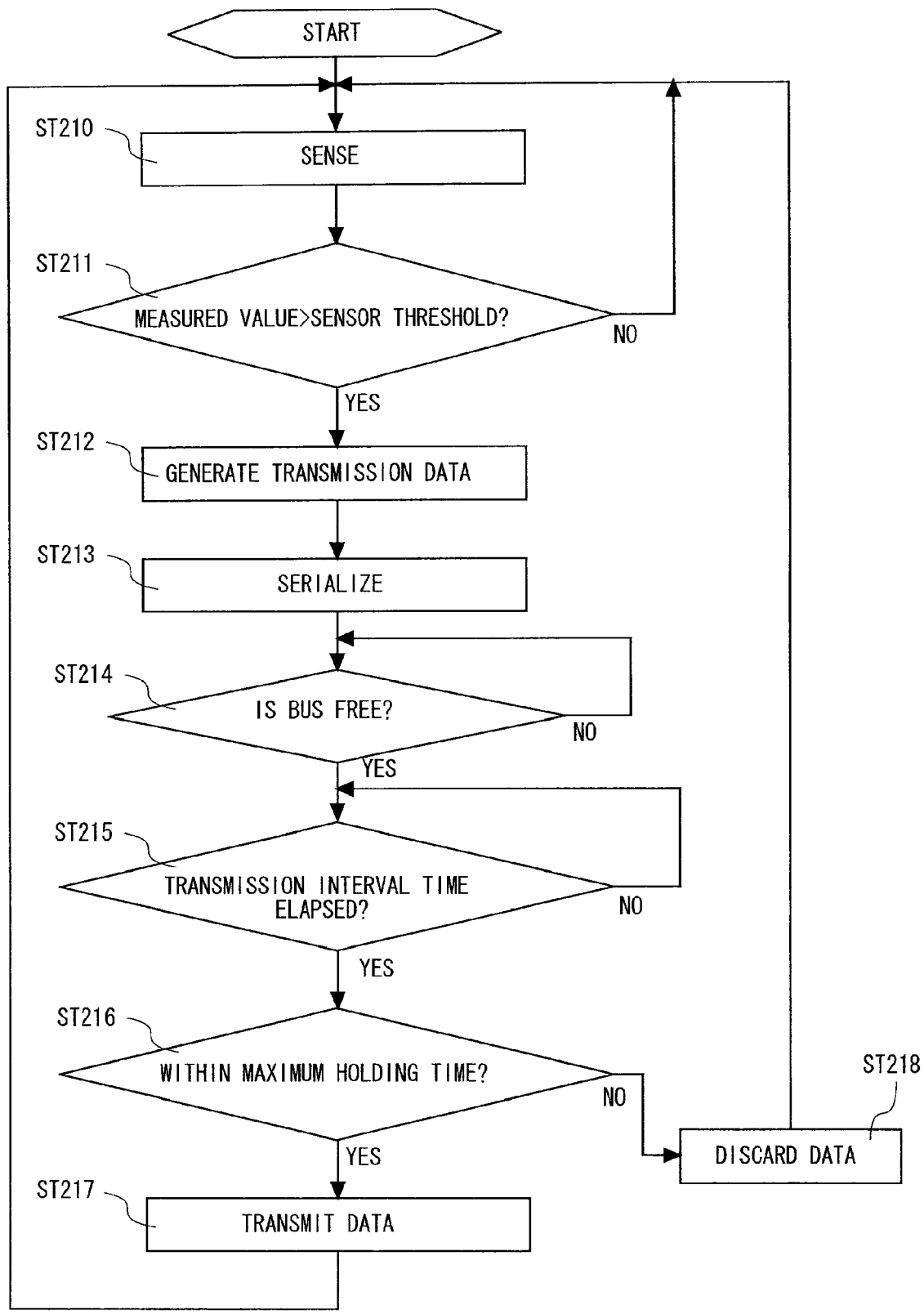
FIG. 10 is a flowchart showing the operation procedure from when the touch sensor device performs sensing until data transmission.

Next, an operation from when the touch sensor device 200 performs sensing until the data transmission is explained with reference to the flowchart of FIG. 10.

After the power is turned on and the initial setting transmission ends, the touch sensor device 200 performs the sensing operation (ST210).

The sensing operation here indicates digitally converting the capacity change between plates into the frequency change and retrieving the physical amount (for example, a force) applied on the sensor surface 212 as the digital sensor signal.

This sensing operation is executed at all time by the selection signal Sct or the like with a constant cycle in the digital converting unit 320.

The digital sensor signal is transmitted to the threshold evaluating unit 330 and compared to the preset sensor threshold.

When the digital sensor signal does not exceed the sensor threshold (ST221: NO), the transmission process of this digital sensor signal is not performed and it returns to the sensing operation again.

On the other hand, when the digital sensor signal exceeds the sensor threshold (ST221: YES), transmission data generation (ST212) for externally outputting this digital sensor signal is performed.

The transmission data generation (ST212) is performed in the data generating unit 340.

Specifically, while the transmitter identification number ID is added to the digital sensor signal, a preamble, a start bit, a CRC bit (Cyclic Redundancy Check), and a stop bit are added and the transmission data is generated (see FIG. 8).

The transmission data generated in this way is serialized by the serializing unit 350 (ST213) and output to the data transmitting unit 370.

The data transmitting unit 370 evaluates whether a plurality of conditions (ST214, ST215, and ST216) are satisfied before transmitting the data. Specifically, first, the evaluation result of the bus state is confirmed by the bus state evaluating unit 360.

When the bus 110 is busy, the transmission standby instruction is output from the bus state evaluating unit 360 to the data transmitting unit. Then, the bus state evaluating unit 360 evaluates the state of the bus 110 again after the preset standby time elapsed.

When the bus 110 is free (ST214:YES), the data transmitting unit 370 confirms whether there is a transmission interval.

To be specific, whether the time since the last data transmission is longer than or equal to the transmission interval time is confirmed, and the transmission interval time is stood by until the transmission interval time elapses.

When the transmission interval time has elapsed (ST215: YES), the confirmation is made whether or not the data holding time is within the maximum holding time.

When the data holding time is within the maximum holding time (ST216), the data transmitting unit 370 transmits the transmission data on the signal line 113 of the bus 110.

The transmitted data is transmitted to the information integrating device 140 via the information relaying device 120 and the concentrator 130.

On the other hand, when the data holding time exceeds the maximum holding time, the data transmitting unit 370 does not transmit the data, discards the data, returns to ST210, and executes from the sensing.

These operations are repeated in a loop until a predetermined end condition (for example power supply stop) is satisfied.

The information integrating device 140 sequentially receives the transmission data from the touch sensor device 200. Then, the information integrating device 140 detects what extent of force is applied to where on the touch sensor system according to the received data.

When there is the touch sensor device 200 that is registered to the communication network built in the initial setting but does not transmit the data for certain time or longer, the touch sensor device is evaluated to have broke down and deleted from the communication network.

(Example of Operation)

Figure 11:
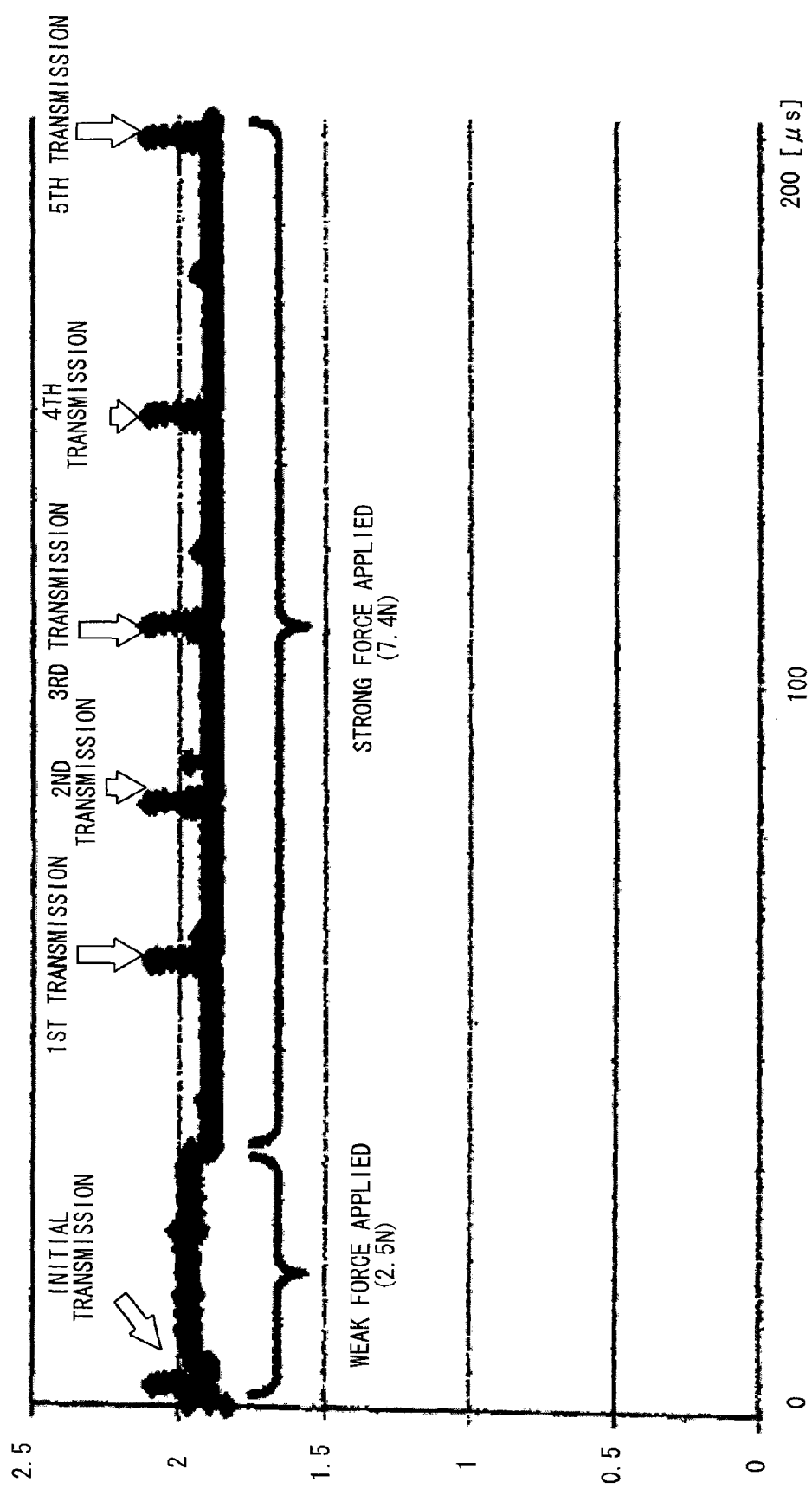
FIG. 11 is a view plotting power consumption of one touch sensor device.

Next, an actual operation example is shown with reference to FIG. 11.

After the touch sensor system 100 is powered on, a weak force of less than the threshold is applied to all the touch sensor devices 200 until 40 µs, and a force more than or equal to the threshold is applied to all the touch sensor devices 200 after 40 µs has elapsed.

FIG. 11 is a view plotting the power consumption of one touch sensor device 200 with the horizontal axis as a time axis.

After the power was turned on, the touch sensor device 200 stands by for the time according to its own transmitter identification number ID and then performs the initial setting.

The power consumption peak at the time of this initial transmission appears.

Then, as the weak force less than or equal to the threshold is applied until 40 µs, the digital sensor signal obtained from the sensing does not exceed the sensor threshold.

In this case, the threshold evaluating unit 330 evaluates that the digital sensor signal does not exceed the sensor threshold and the following data processes are not performed.

Accordingly, only the electric power necessary for the sensing (digital conversion) is consumed until 40 µs.

The strong force exceeding the threshold is applied after 40 µs.

Then, the transmission data is generated by the data generating unit 340 and the data is transmitted.

Since the electric power for the transmission process is large, the power consumption peak appears at the time of the transmission operation.

Further, as the strong force is continuously applied, the touch sensor device 200 attempts to continue generating the transmission data.

However, as the force is applied to all the touch sensor devices 200, the bus 110 becomes busy and the standby time is generated. Then, since the bus state evaluating unit 360 increases the waiting time at a predetermined ratio when the bus 110 is continuously evaluated to be busy, it is shown that the transmission interval becomes longer.

The touch sensor system 100 including such a configuration achieves the following exemplary advantage.

(1) The touch sensor device 200 includes the sensor unit 210 and the signal processing unit 300, and the analog sensor signal is processed in the signal processing unit 300.

As the signal process is performed in individual touch sensor device 200, the signal processing load of the information integrating device 140 can be reduced.

Even when a number of touch sensor devices 200 are disposed in the sensor system, the increase in the processing load of the information integrating device 140 can be reduced, thus a novel touch sensor system can be achieved that is a large system including many touch sensor devices 200 and still capable of fast responses.

(2) The touch sensor device 200 includes the digital converting unit 320 that digitally converts the analog sensor signal.

Accordingly, since the digital signal is transmitted from the touch sensor device 200 to the information integrating device 140, even when the wiring length between the touch sensor device 200 and the information integrating device 140 is long, it is not susceptible to noise.

For example, when the touch sensor devices 200 are provided to the entire body surface of the robot, the wiring length will be considerable, thus the noise immunity becomes important.

The configuration of this embodiment is suitable for the sensor system including a number of touch sensor devices as compared to the case of transmitting analog signals as is.

(3) The touch sensor device 200 includes the threshold evaluating unit 330 that transmits the sensor data to the information integrating device 140 only when the sensor value exceeds the predetermined threshold.

Accordingly, the amount of data flowing through the bus is reduced as a whole and bus crosstalk is reduced.

Since there is no crosstalk of the bus 110, the transmission waiting time is reduced and the sensed data is transmitted at desired timings from each touch sensor device to the information integrated device, thereby resulting in faster responses.

Moreover, transmission and reception of the data is not performed when there is no detection or the detection of threshold or less, the amount of data processed by the information integrating device 140 is reduced and the processing load of the information integrating device 140 is reduced.

The sensor system is achieved with less bus crosstalk and fast responses even when the number of touch sensor devices increases.

(4) The touch sensor device 200 includes the ID adding unit 341 that adds its own transmitter identification number and transmits the sensor data signal.

This transmitter identification number allows the information integrating device 140 to identify the source touch sensor device 200.

Thus, the exchange of request packets between the information integrating device 140 and the touch sensor device 200 will be unnecessary, and the touch sensor device 200 can transmit the sensor data immediately when there is the detection exceeding the threshold.

When the exchange of request packets occurs among a number of touch sensor devices, the buses may be crossed.

In this regard, this embodiment can build the sensor system that reduces the amount of data flowing through the bus 110 and capable of fast responses even when a number of touch sensor devices are provided.

(5) Since the touch sensor device can be arranged anywhere on the bus 110, the arrangement of the touch sensor devices 200 can be freely changed.

For example, while disposing many touch sensor devices 200 closely on the hand part, there may be less number of touch sensor devices 200 on the back part.

Moreover, since the plurality of touch sensor devices 200 can be disposed on one bus, the number of lines can be dramatically reduced as compared to the case of wiring individual touch sensor device.

(6) The touch sensor device 200 includes the bus state evaluating unit 360 that transmits the data from the data transmitting unit 370 when the bus 110 is free.

When a number of touch sensor devices 200 are provided to one bus 110, it is highly possible that the buses 110 are congested.

In conventional techniques, the host has been performing centralized management such as issuing request packets in order to control the buses, however there is a problem that the bus is occupied for the exchange of the request packets.

In this regard, in this embodiment, the sensor data signal is transmitted when each touch sensor device 200 evaluates the state of the bus 110 as transmittable.

Accordingly, even when a number of touch sensor devices 200 are provided, the sensor system can be achieved that avoids the congestion of the buses 110 with fast responses.

(7) When the holding time of the sensor data signal to be transmitted exceeds predetermined time in the state with no transmission permission, the data transmitting unit 340 discards the holding sensor data signal and executes from the sensing to obtain the latest data.

When a number of touch sensor devices 200 are provided, the transmission standby time may be long.

Transmission of useless delayed sensor data in such a case causes the congestion of buses and also increases the processing load of the information integrating device 140.

In this regard, according to this embodiment, as the latest sensor data is obtained when the holding time passes predetermined time or longer, the delayed sensor data is not transmitted in vain.

(8) Once the data transmitting unit 370 transmits the sensor data signal, the data transmission is stopped for the preset waiting time until the next transmission.

Accordingly, it is possible to prevent from occupying the bus 110 by continuous transmission from one or a small number of the touch sensor devices 200, and thus the information integrating device 140 can obtain the detection data of the entire system.

Moreover, as the transmitter identification number is set according to the waiting time, the waiting time is different for each touch sensor device 200.

Therefore, for example, even when the plurality of touch sensor devices 200 enter transmission waiting state at the same time, the standby time is respectively different.

Then, as each touch sensor device 200 performs the data transmission at different timings, the congestion of the buses 110 is avoided as much as possible.

Note that the waiting time may be set regardless of the transmitter identification number as long as the waiting time is different between the touch sensor devices.

(9) The asynchronous communication is adopted for the data transmission between the touch sensor device 200 and the information integrating device 140.

When a number of touch sensor devices 200 are provided, managing and controlling those transmission timings by the host side brings a large processing load for the host.

At the time of the differential serial transmission, a low-voltage differential signal interface called LVDS (Low Voltage Differential Signaling) is used.

There is also a problem that the bus is occupied by the request packets.

In this regard, this embodiment adopts the asynchronous communication and the data is transmitted at an arbitrary timing of the touch sensor device 200 from the touch sensor device 200 to the information integrating device 140.

Accordingly, the processing load of the information integrating device 140 is reduced and also the response speed of the sensor system can be faster even when a number of touch sensor devices 200 are provided.

(10) The number of signal lines 113 and 113 of the bus 110 is two, and the transmission of the sensor data signal is executed by the differential serial transmission between the touch sensor device 200 and the information integrating device 140.

For example, considering the case of arranging the touch sensor devices 200 to the entire body surface of the robot, the number of bus 110 lines will be extremely large.

At this time, when there are many signal lines of the bus 110, the width of the bus 110 will be wider for that amount and it not desirable in the case of wiring the entire body surface of the robot.

Moreover, as effort for wiring connection between the touch sensor device 200 and the buses 110 increases in proportion to the increase in the number of signal lines, the number of signal lines is desirably small in consideration of arranging a number of touch sensor devices 200.

In this regard, in this embodiment, there are only two signal lines 113 and 113, which is an extremely small number.

Since the two signal lines transmit differential signals, noise immunity is sufficiently high.

Therefore, this embodiment is suitable for the sensor system including a number of touch sensor devices 200.

(11) The touch sensor device 200 executes the transmission of the transmitter identification number when the power-on is detected.

Specifically, the information integrating device 140 can recognize and also distinguish the touch sensor devices 200 included in the system by recording the transmitter identification number transmitted first.

In such a configuration, the arrangement position of the touch sensor device 200 may not be fixed.

For example, turning on the power again in the case of changing the arrangement configuration of the touch sensor devices 200 enables the information integrating device 140 to automatically receive the transmitter identification number from each touch sensor device 200 and build the communication network.

(12) Furthermore, at the stage of the initial transmission, the initial transmission command unit detects the power-on and stands by for the time according to the transmitter identification number, and then commands the transmission of the transmitter identification number.

In such a configuration, as each touch sensor device 200 performs the data transmission at different timings, the congestion of the buses 110 is avoided as much as possible.

(13) Since the end number is set to the touch sensor device 200 provided to the end of each bus 110, when the information integrating device 140 receives this end number at the stage of initial transmission, the end of each bus 110 can be recognized. Then the information integrating device 140 can identify each end of the bus 110 and build the communication network.

Further, using the maximum value (for example 255) that can be set as the transmitter identification number for the end number eliminates the need to separately set the end number and enables simplification of the system and the reduction of the information to be processed.

Note that the present invention is not limited to the above embodiment but can be changed in the range not departing from the scope.

Although in the abovementioned embodiment, a case of detecting the force applied to the sensor unit from the change in the distance between two electrode plates is illustrated, the configuration of the sensor unit is not especially limited as long as it is the one that can detect the physical amount to be a detecting object.

As the configuration of the touch sensor device, it is preferable that components are integrated on the substrate with the sensor unit as MEMS (Micro Electro Mechanical Systems), the signal processing unit is also integrated on the semiconductor substrate, and MEMS of the sensor unit and the semiconductor substrate of the signal processing unit are bonded to form one integrated sensor element chip.

However, the touch sensor device is not necessarily integrated but the sensor unit and the signal processing unit may be separated and disposed in proximity to each other.

In the touch sensor device, the sensor sensitivity and the sensor threshold may be set as follows.

Setting the sensor sensitivity here indicates adjusting and setting the voltage level and sampling clocks in the digital converting unit.

A memory and a register are embedded in the touch sensor device. Then, the sensor sensitivity and the sensor threshold are set to the memory.

A mask ROM, an OTP (One Time Programmable) memory, an EPROM (Erasabele Programmable ROM), or the like can be adopted as the memory here.

The timing to set the sensor sensitivity and the sensor threshold to the memory may be at the time of manufacturing the touch sensor device or before mounting the sensor system to the robot or after mounting the sensor system to the robot.

When the sensor system sensitivity and the sensor threshold are set to the memory at the time of manufacturing the touch sensor device or before the sensor system is mounted to the robot, writing is performed to the memory using a dedicated write terminal.

When the sensor sensitivity and the sensor threshold are written to the memory after the sensor system is mounted to the robot, the touch sensor device may perform setting by individual learning or the ID and setting information may be transmitted from the information integrating device and each sensor device may take in the setting information with the ID corresponding to itself and set it to the memory.

The sensor sensitivity and the sensor threshold are set to the memory by such a method, and the register takes in the sensor sensitivity and the sensor threshold from the memory at the time of operation.

Then, the digital converting unit adjusts the voltage level and the sampling clocks according to the sensor sensitivity set to the register.

Moreover, the threshold evaluating unit performs threshold evaluation using the sensor threshold set to the register.

Such a configuration enables flexible setting of the sensor sensitivity and the sensor threshold of the sensor device according to the position attached to the robot.

Setting the sensor sensitivity and the sensor threshold allows appropriate adjustment of the balance between the quality and quantity of the transmission data, and thereby resulting in the reduction in the load in the information integrating device.

Further, appropriate setting of the sensor sensitivity and the sensor threshold enables the reduction in the number of times of the data collision and fast responses, and more than a few hundreds of touch sensor devices can be installed.

INDUSTRIAL APPLICABILITY

The present invention can be used to a touch sensor system that is provided to, for example, a surface part of a robot (such as a hand part or an entire body surface) and detects a contact with an object.

REFERENCE SIGNS LIST

100 TOUCH SENSOR SYSTEM, 110 BUS, 111 FLEXIBLE SUBSTRATE, 112 POWER SUPPLY LINE, 113 SIGNAL LINE, 120 INFORMATION RELAYING DEVICE, 130 CONCENTRATOR, 140 INFORMATION INTEGRATING DEVICE, 200, TOUCH SENSOR DEVICE, 210 SENSOR UNIT, 211 ELECTRODE PLATE, 212 SENSOR SURFACE, 220, ADHESIVE LAYER, 300 SIGNAL PROCESSING UNIT, 310 CLOCK CONTROL UNIT, 320 DIGITAL CONVERTING UNIT, 330 THRESHOLD EVALUATING UNIT, 340 DATA GENERATING UNIT, 340 DATA TRANSMITTING UNIT, 341 ID ADDING UNIT, 250 SERIALIZING UNIT, 360 BUS STATE EVALUATING UNIT, 370 DATA TRANSMITTING UNIT, 380 INITIAL TRANSMISSION COMMAND UNIT

The invention claimed is:

1. A touch sensor system comprising:
one or more buses including a power supply line and a signal line;
a plurality of touch sensor devices that are disposed on each of the bus and supplied with power from the bus; and
an information integrating device that is connected to all the buses and integrates information from the plurality of touch sensor devices, wherein the touch sensor device comprises:
  a sensor unit that outputs an analog sensor signal, the analog sensor signal changing according to an action from a detecting object; and
  a signal processing unit that transmits a sensor data signal to the information integrating device through the bus, the sensor data signal being the processed analog sensor signal from the sensor unit,
wherein the signal processing unit comprises:
  a digital converting unit that digitally converts the analog sensor signal;
  a threshold evaluating unit that gives a start permission of a signal process when a sensor value by the sensor unit exceeds a preset threshold;
  an ID adding unit that adds a transmitter identification number to the sensor data signal, the transmitter identification number being previously added to itself; and
  a data transmitting unit that outputs the sensor data signal to a signal line of the bus; and
  bus state evaluating unit that evaluates a state of the signal line of the bus; and
  an initial transmission command unit that commands transmission of the transmitter identification number at the time of detecting power-on, wherein the bus state evaluating unit stops signal transmission of the data transmitting unit when the bus is busy, and permits the signal transmission of the data transmitting unit when the bus is free, further evaluates the state of the bus again after preset waiting time has elapsed when the bus is busy, and increases standby time at a predetermined ratio when the waiting time is continuously generated, and the information integrating device includes a function to switch power on and off and also receives the transmitter identification number transmitted from each of the touch sensor devices at the time of the power-on and builds a communication network based on the received transmitter identification number.

2. The touch sensor system according to 1, wherein when holding time of the sensor data signal to be transmitted in a state with no transmission permission exceeds predetermined time, the data transmitting unit discards the sensor data signal.

3. The touch sensor system according to claim 1, wherein after the sensor data signal is transmitted once, the data transmitting unit stops data transmission for the preset waiting time until next transmission.

4. The touch sensor system according to claim 3, wherein the waiting time is determined according to the transmitter identification number.

5. The touch sensor system according to claim 1, wherein the data transmitting unit transmits the sensor data signal by asynchronous communication.

6. The touch sensor system according to claim 1, wherein the signal processing unit comprises a serial converting unit that serializes the sensor data signal, and the data transmitting unit transmits data that is serial converted in the serial converting unit.

7. The touch sensor system according to claim 6, wherein the number of signal lines of the bus is two, and the data transmitting unit transmits the sensor data signal by differential serial transmission.

8. The touch sensor system according to claim 1, wherein the initial transmission command unit stands by for time according to the transmitter identification number after the power-on is detected, and then commands the transmission of the transmitter identification number.

9. The touch sensor system according to claim 1, wherein an end number is set to the touch sensor device that is provided at an end of each of the bus.

10. The touch sensor system according to claim 1, wherein the transmitter identification number of the touch sensor device provided at the end of each of the bus is a maximum value that can be set as the transmitter identification number and this is the end number.

11. The touch sensor system according to claim 1, wherein the information integrating device builds the communication network with the identified contact sensor device based on the received transmitter identification number, and a position of each of the contact sensor device is learned and recorded based on the sensor data signal at the time when the object with previously identified position concerns each of the contact sensor device.

12. The touch sensor system according to claim 1, wherein the information integrating device builds the communication network with the identified contact sensor device based on the received transmitter identification number, and a network structure is learned and recorded based on the sensor data signal at the time when the object with previously identified position concerns each of the contact sensor device provided at the end of each of the bus.

13. The touch sensor system according to claim 1, wherein the information integrating device builds the communication network with the identified contact sensor device according to the received transmitter identification number, and the network structure is built using position information of each of the touch sensor device that is set and input externally.

14. The touch sensor system according to claim 1, wherein when there is no data transmission for certain time or longer from one of the touch sensor device, the information integrating device evaluates that the touch sensor device broke down.

15. The touch sensor system according to claim 1, wherein when a communication system goes down due to congestion of the buses exceeding a limit value, the information integrating device resets the system by turning the power on again.

16. The touch sensor system according to claim 1, further comprising an information relaying device that is set with unique transmitter identification information and provided on the way of each of the bus, wherein the information relaying device transmits a data signal that is generated by further adding its own transmitter identification number to the sensor data signal from each of the touch sensor device.

17. The touch sensor system according to claim 1, further comprising a concentrator that concentrates the plurality of buses, wherein the concentrator transmits the data signal that is generated by further adding its own transmitter identification number to the sensor data signal from each of the touch sensor device.

18. The touch sensor system according to claim 1, wherein the information integrating device comprises a transmission means for transmitting setting information to the touch sensor devices, and each of the touch sensor devices comprises a memory, and sets the transmitted setting information to the memory.

* * * * *